United States Patent

[11] 3,628,226

[72] Inventor Marvin L. Nelson
 Fullerton, Calif.
[21] Appl. No. 19,897
[22] Filed Mar. 16, 1970
[45] Patented Dec. 21, 1971
[73] Assignee Aerojet-General Corporation
 El Monte, Calif.

[54] METHOD OF MAKING HOLLOW COMPRESSOR BLADES
 3 Claims, 10 Drawing Figs.
[52] U.S. Cl. ........................................ 29/156.8 H,
  29/480, 29/483, 29/DIG. 20, 29/DIG. 48
[51] Int. Cl. ........................................ B23p 15/02,
  B23p 15/04
[50] Field of Search ........................................ 29/156.8 H,
  483, 480, DIG. 20, DIG. 48

[56] References Cited
 UNITED STATES PATENTS
2,787,049 4/1957 Stalker ........................ 29/156.8 H
2,807,437 9/1957 Roush ........................ 29/156.8 H X
3,106,014 10/1963 Brick et al. ........................ 29/483 X
3,182,955 5/1965 Hyde ........................ 29/156.8 H X
3,193,919 7/1965 Rouse ........................ 29/480 X Primary Examiner—John F. Campbell
Assistant Examiner—D. C. Reiley
Attorneys—Edward O. Ansell and D. Gordon Angus ABSTRACT: A method of manufacturing hollow compressor blades. A pair of forgings are first rough machined into flat blanks. Complimentary grooves are machined in one surface of each half, and the other surface is hot-formed to an airfoil shape. The grooved surface of each blank is machined to a flat plane, and the finished blanks are bonded together. Finally, the bonded blade is twist-formed and final-machined to produce a finished hollow compressor blade. A principal improvement over the prior art lies in bonding the two blanks before twist-forming is accomplished.

INVENTOR.
MARVIN L. NELSON
BY Edward O. Ansell

ATTORNEY

METHOD OF MAKING HOLLOW COMPRESSOR BLADES

BACKGROUND OF THE INVENTION

The great majority of compressor blades produced at the present time are solid blades. In a typical fan jet engine compressor these blades are approximately 30 inches in length. Harmonics develop in use, requiring the addition of midspan dampers. This results in significant weight increase and additional manufacturing operations. A few manufacturers have recently investigated the possibility of producing hollow compressor blades. Hollow blades eliminate the necessity of midspan dampers, making possible a 50 percent weight reduction and the elimination of the manufacturing operations required for installation of midspan dampers.

A typical method of manufacturing hollow compressor blades consists in milling indentations in forged blanks, corresponding to the two halves of the final compressor blade. The two halves are then twisted to conform to the critical dimensions of the airfoil surfaces of the final blade, then bonded together and machined to a finished product. The principal difficulty with this method is that, where the two halves are twist-formed prior to bonding, the interface between the two halves is not flat. Therefore it is difficult to supply the necessary perpendicular forces to produce a satisfactory bond. The present method consists of bonding the two halves before they are twist-formed, and then, after bonding has been accomplished, twist-forming the rough compressor blade into the desired shape. This present method results in a far more rigid and reliable finished product than was heretofore obtainable.

SUMMARY OF INVENTION

It is therefore the principal object of the present invention to provide a method of forming hollow compressor blades which is both inexpensive and more reliable than methods heretofore employed.

It is also an object of the present invention to provide a novel method of and an improved means for fabricating hollow compressor blades.

In its principal aspect, the present invention comprises a method of forming hollow compressor blades, wherein twist-forming of the final compressor blade is accomplished after the two halves of the blade have been grooved and bonded together. Initially, two forgings are rough machined into flat blanks. Complimentary grooves are then machined into the inner surface of each half. Subsequently, the outer surface of each half is hot-formed into a preliminary airfoil surface and the inner surface of each half is machined to a flat plane, the two parts then being diffusion bonded together. Bonding is accomplished by placing the two halves together so that the grooves face each other, forming cavities, and applying heat and force so that the applied load is perpendicular to the bond interface. After bonding, the airfoil section is twist-formed, and the blade is machined to the final required configuration.

DESCRIPTION OF PREFERRED EMBODIMENT

Figure 1:
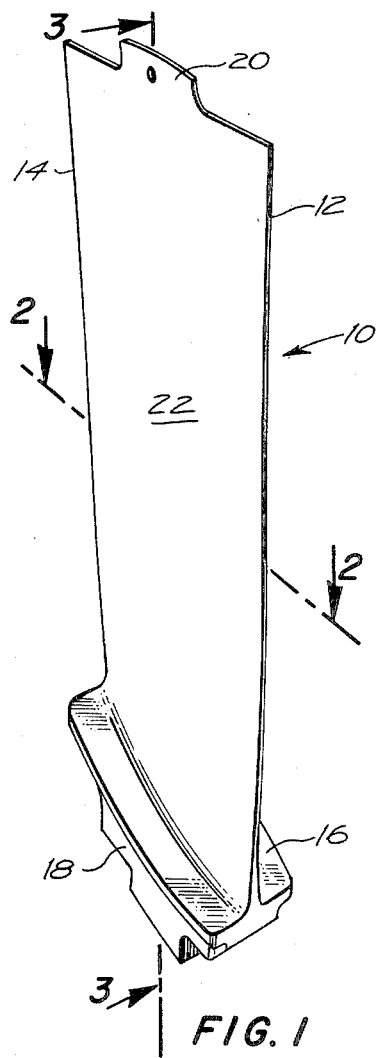
FIG. 1 is a perspective view of a completed compressor blade made in accordance with this invention.

Referring now to FIG. 1 of the drawings, the finished hollow compressor blade 10 comprises a root section 18, a platform 16 and an airfoil surface 22, with a leading edge 12 and a trailing edge 14. The tip 20 of the finished blade 10 is joined to the compressor rim (not shown).

Figure 3:
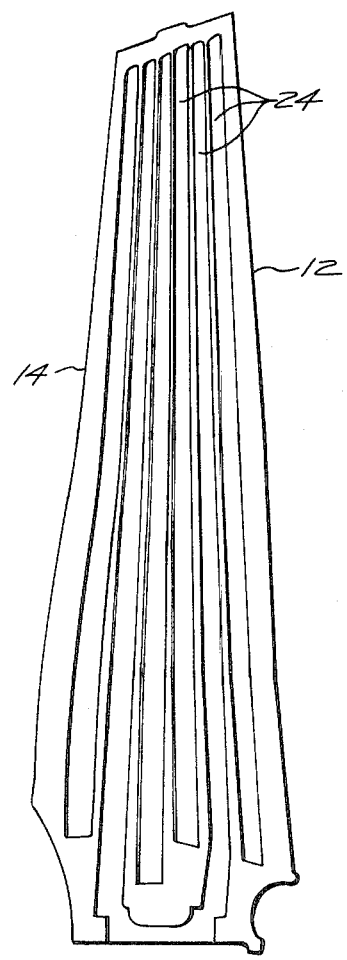
FIG. 3 is a sectional view of the blade shown in FIG. 1 taken along line 3—3.
Figure 2:
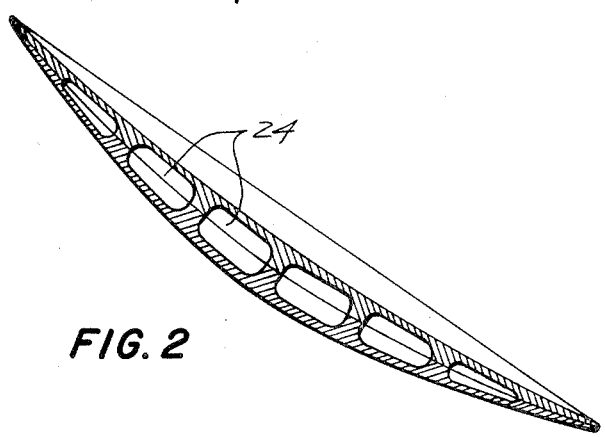
FIG. 2 is a sectional view of the blade shown in FIG. 1 taken along line 2—2.

Within the finished blade 10 are one or more cavities 24, as shown in FIGS. 2 and 3. Although FIGS. 2 and 3 depict blades having six cavities, it is to be understood that the method of this invention may be utilized to manufacture blades having any desired number of cavities. These cavities are formed when the grooves 38 in the grooved blanks 36 are placed in contact, just prior to bonding. It is these cavities within the finished blade 10 which distinguish this hollow compressor blade from conventional solid compressor blades. As mentioned previously these cavities decrease the final weight of the compressor blade and also obviate the necessity of introducing midspan damping into the blade.

Figure 4:
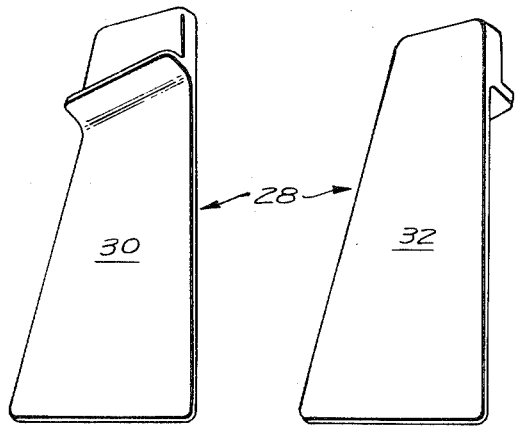
FIG. 4 is a perspective view of the initial forgings.

To construct a hollow compressor blade in accordance with the method of this invention it is first necessary to obtain a pair of forgings 28, as shown in FIG. 4. These forgings, having outer surfaces 30 and inner surfaces 32, correspond to the two halves of the compressor blade. The forgings may be made of any suitable material. In the preferred embodiment, however, they are to be made of an alloy of 6 percent aluminum, 4 percent vanadium and 90 percent titanium. This alloy is particularly suitable for production of compressor blades for large fan-type jet engines.

Figure 5:
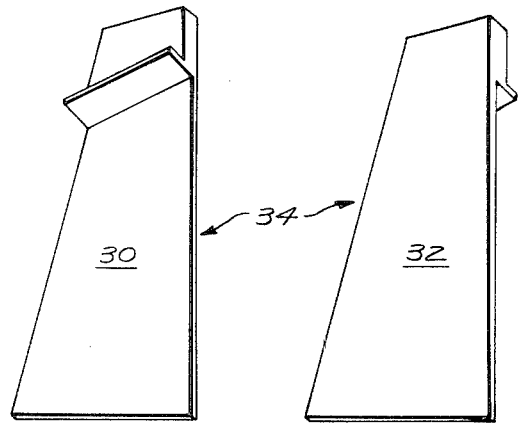
FIG. 5 is a perspective view of the flat blanks made by rough machining the initial forgings.

Ordinarily the two forgings 28 are first rough machined into flat blanks 34, as shown in FIG. 5. Machining can be accomplished by any suitable machining method. The purpose of this step is to eliminate imperfections in forging and to bring the forgings 28 into conformity with the size and shape required for subsequent operations.

Figure 6:
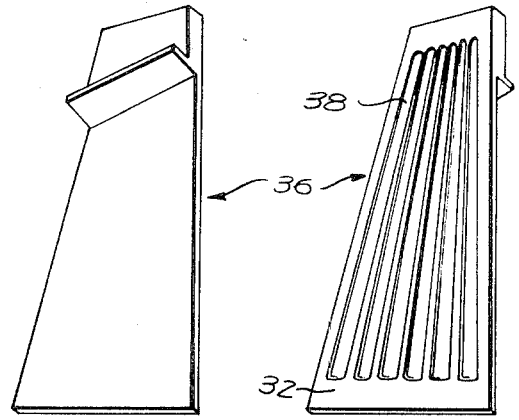
FIG. 6 is a perspective view of the grooved blanks made by machining grooves into one surface of each flat blank.

The flat blanks 34 are then transformed into grooved blanks 36, as shown in FIG. 6. This is accomplished by machining grooves 38 into the inner surfaces 32 of the flat blanks. In the preferred embodiment these grooves are produced by numerical control machining apparatus. They may be produced, however, by employment of "chem" milling or any other suitable procedure. The shape of the grooves is not critical. They may be semicircular, rectangular or of any other cross-sectional shape. Caution must be exercised, however, in limiting the depth of these grooves so that during subsequent forming and shaping of the hollow compressor blade there is no cutting through of the grooves to the outer surface of the blade. When the inner surfaces 32 of the grooved blanks 36 are placed together, channels are formed, corresponding to the cavities 24 in the finished blade 10. These cavities distinguish this style of hollow compressor blade from conventional solid compressor blades. The step of grooving is accomplished while the blanks are flat in order to eliminate the necessity of employing sophisticated and expensive methods of three-dimenional ball machining, as would be required if the grooves were cut into blanks already twisted into an airfoil shape.

Figure 7:
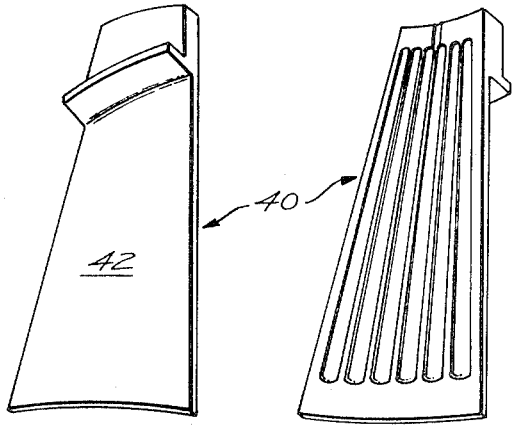
FIG. 7 is a perspective view of the airfoil surfaced blanks made by hot-forming an outer surface onto each of the grooved blanks.

The grooved blanks 36 are formed into airfoil surfaced blanks 40 with preliminary airfoil surfaces 42, as shown in FIG. 7. This is accomplished by the application of heat and pressure. Each blank is placed within a set of dies whose inner faces correspond in shape to the desired preliminary airfoil configuration. The blank is insulated from direct contact with the dies by means of a suitable high-temperature release agent, such as Everlube, a molybdenum disulfide-based substance. The blank is heated to a temperature of approximately 1,450° F. in the case of the preferred embodiment of this invention, where the alloy used is the titanium alloy described above. When the blank is thoroughly heated to this temperature a pressure of approximately 3,000 lbs. per square inch is applied for approximately 30 minutes. It is essential that this operation be conducted in an inert atmosphere—an atmosphere of argon gas is preferable. This inert atmosphere should be maintained during the entire period in which the blank is above ambient temperatures. If precautions are not taken to control the atmosphere, contamination of the surfaces of the grooved blanks will occur, causing cracks and other imperfections to appear. Before being removed from the dies the grooved blanks should be allowed to cool to ambient temperatures, at all times out of contact with any atmospheric or other contaminant.

Figure 8:
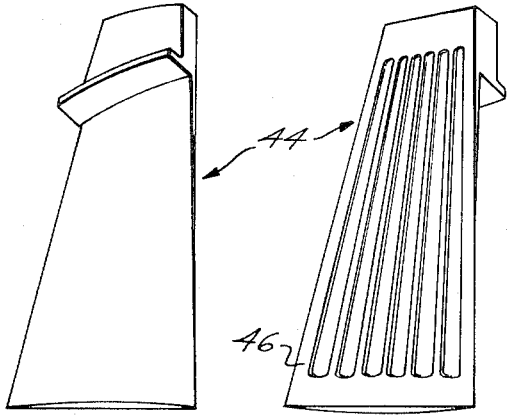
FIG. 8 is a perspective view of the finished blanks made by machining a flat inner surface onto each airfoil surfaced blank.

The airfoil surfaced blanks 40 are then machined flat on their inner surfaces to produce finished blanks 44 with flat interface surfaces 46, as shown in FIG. 8. For this operation the preliminary airfoil surface 42 of each blank is fixed with an appropriate adhesive mixture to a holder whose inner face corresponds in shape to the preliminary airfoil surface 42 of the airfoil surface blank 40. It will be noted that upon cooling of the airfoil surfaced blank subsequent to the previous operation of hot-forming the preliminary airfoil surface, contraction of the airfoil surfaced blank will have taken place. Thus the inner face of the holder will be shaped to a different configuration than that of the die used in hot-forming the preliminary airfoil surface. It is also important to note that while it is being held by the adhesive in the holder, the airfoil surfaced blank should not be held in a strained position. This is to avoid the formation of internal stresses and to insure that when the flat interface surface 46 is machined onto the inner surface of the airfoil surfaced blank, it will be machined to a perfectly flat plane. Once it has been thus securely fastened by the adhesive to the holder, the airfoil surfaced blank 40 is machined on its inner surface to a perfectly flat interface surface 46. Machining can be accomplished by ordinary milling methods or any other satisfactory procedure. The entire inner surface of the airfoil surfaced blank is machined flat.

Figures 9, 10:
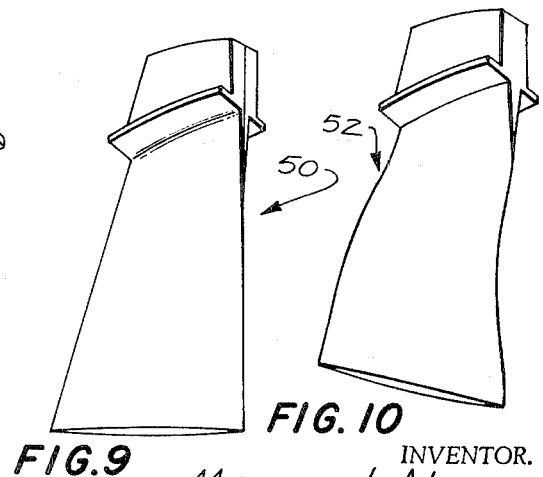
FIG. 9 is a perspective view of a rough blade made by bonding a pair of finished blanks together.
FIG. 10 is a perspective view of a curved blade, made by twist-forming the rough blade.

The flat interface surfaces 46 of the two finished blanks 44 are next diffusion bonded together to form a rough blade 50, as shown in FIG. 9. It is first necessary to clean the finished blanks; in the case of the preferred embodiment, where the titanium alloy is employed, a standard titanium etch would be used. They are subsequently washed with an isopropyl alcohol solution. Upon drying, the finished blanks are isolated so that they will receive no contamination from fingerprints, dust or any other source. Clean polyethylene bags may be used for this purpose. Care should also be taken to reduce the elapsed time between cleaning and bonding to a minimum. The clean finished blanks 44 are placed into a pair of dies, the inner faces of which correspond to the airfoil surfaces 42 of the finished blanks. Care must be taken in construction of the dies so that when the flat interface surfaces 46 of the finished blanks are joined together, the grooves 30 will be accurately aligned, forming channels and insuring that there is sufficient metal contact to form a good bond to the interface. It is advisable to supply the dies with pins so that when the two finished blanks 44 are placed together they can be securely held together in a satisfactory alignment during the bonding process.

The diffusion bonding process consists of placing the flat interface surfaces 46 of the finished blanks 44 together within the dies, so that they are securely held and aligned as described above. Again, a suitable high-temperature release agent is employed. The entire apparatus is heated. In the case of the preferred titanium alloy described above it is raised to a temperature of approximately 1,700° F. When the finished blanks have been thoroughly heated to this temperature, an external pressure of approximately 1,000 lbs. per square inch is applied so that the force vector is perpendicular to the interface between the two finished blanks. It is necessary to design the dies so that this can be readily accomplished. While the blanks are maintained at this temperature the pressure is continued for approximately 1 hour. The duration of the pressure depends on the type of material used, the size of the blades being produced and the depth of the bond desired. Upon bonding, the rough blade is allowed to cool to ambient temperatures. It is important to note that this entire operation must be conducted in an inert atmosphere, such as argon gas, to insure that no contamination occurs.

A principal advantage of the method employed in this present invention is that since the interface surfaces 46 of the two finished blanks 44 are in the form of flat planes, there is uniform contact between them at the time of bonding. Consequently in this method it is simple to apply an external load perpendicular to this interface and thus achieve uniform and consistent bonding. This is in contrast to the methods heretofore employed, where the final airfoil configuration is formed in the two halves before bonding. The difficulty of that method is that there is no simple means of applying an external load perpendicular to the interface of the two halves. Consequently it is difficult, when applying this heretofore employed method, to achieve uniform and consistent bonding. However, the method of this invention eliminates such problems.

The rough blade 50 is then twist-formed to produce a curved blade 52, as shown in FIG. 10. The uniform, consistent bond achieved by the method of this invention insures that this operation can be readily accomplished without collapsing the channels within the rough blade. To avoid cracking or production of internal stresses, however, this twisting must take place in several steps. For a 30 inch blade, such as is used in typical fan-type jet engine compressor, this twisting must be accomplished in four preliminary twisting operations and one final twisting operation. The first operations consist of working the root and platform areas; the final operations involve the airfoil surface, itself. The number of preliminary twisting operations would increase as the size of the desired blade increases and as the depth of the twist increases. The purpose of this twisting operation is twofold. One purpose is to change the convexo-convex aspect of the preliminary airfoil surface 42 of the rough blade 50 into the required concavo-convex airfoil surface 22 of the finished blade 10. The other purpose is to create a spiral twist in the preliminary airfoil surface 42 to confirm to the airfoil surface 22 of the final blade. For each twisting step a separate set of dies is required. In each step the blade is placed within the appropriate set of dies and heated thoroughly to the proper temperature; in the case of the preferred titanium alloy discussed above this would be approximately 1,450° F. A suitable release agent insulates the blade from the dies. When the rough blade has been thoroughly heated to the proper temperature an external pressure of approximately 1,000 lbs. per square inch is applied for approximately 30 minutes. After the blade has cooled in the die it is removed, and the next twisting operation is performed. After all the preliminary twisting operations have been performed, a final twist is created by the same method in a set of final twist dies appropriately formed to create the desired configuration of the curved blade 52, depicted in FIG. 10. Again it is important to stress that all of these twisting operations must be performed so as to avoid any contamination of the surfaces while the blade is above ambient temperatures. An inert atmosphere, such as argon, should be used. As a result of these twisting operations a curved blade 52, having internal cavities 24 is formed.

The final step in the production of the hollow compressor blade is final machining to the configuration of the finished blade 10, as depicted in FIG. 1. Final machining is preferably accomplished by numerical control machining methods. However, any suitable machining procedure may be used, for example, "hydrotel" machining. At this stage, it is necessary to machine the edges so that the side of the airfoil corresponding to the trailing edge 14 is smaller than that corresponding to the leading edge 12, so that the proper airfoil surface 22 is achieved. Also the tip 20 is machined at an angle which is proper for secure fastening to the compressor rim. Other fine machining is accomplished to convert the curved blade 52 into the finished blade 10, as depicted in FIG. 1.

As an alternative method of fabricating the finished blade 10, it is possible to perform several of the steps outlined in the above sequence after bonding, instead of before bonding. For example, it is possible to bond the two blades without first forming a preliminary airfoil surface upon them. In that case, the airfoil surface could be produced during final machining or as a step between bonding and twist-forming.

What is claimed is:

1. The method of fabricating hollow compressor blades comprising the steps of:
    diffusion bonding the opposed flat surfaces of a pair of metal forgings, each of said flat surfaces having a plurality of grooves therein;
    twisting said bonded forging pair to a predetermined shape; and
    operating upon the other surfaces of said forging pair to achieve the desired external configuration of the finished blade.

2. The method of fabricating hollow compressor blades comprising the steps of:
    rough machining a pair of metal forgings to produce two flat blanks;
    machining the flat blanks to form grooves on the inner surfaces thereof;
    hot-forming preliminary airfoil surfaces upon the outer surfaces of said grooved blanks;
    machining, to a flat plane, the inner surfaces of the airfoil surfaced blanks;
    diffusion bonding the finished blanks, with the flat inner surfaces in opposing relationship as the bond interface;
    twist-forming the bonded rough blade into a curved blade; and
    final-machining the curved blade to achieve the final external configuration of the finished blade.

3. The method as specified in claim 2, wherein said step of diffusion bonding comprises the steps of:
    placing the airfoil surfaced blanks together with their flat interface surfaces in contact; and
    simultaneously applying heat and a load perpendicular to the bond interface.

* * * * *